United States Patent [19]
Criswell et al.

[11] Patent Number: 5,650,612
[45] Date of Patent: Jul. 22, 1997

[54] OPTICAL SENSOR USING SWEPT WAVELENGTH LIGHT SOURCE

[75] Inventors: Tommy L. Criswell, Seattle; Raymond W. Huggins, Mercer Island; Mahesh C. Reddy, Renton, all of Wash.

[73] Assignee: The Boeing Company, Seattle, Wash.

[21] Appl. No.: 371,196

[22] Filed: Jan. 11, 1995

[51] Int. Cl.⁶ ........................................................ G01J 3/50
[52] U.S. Cl. ............... 250/226; 250/227.18; 250/227.21; 359/124
[58] Field of Search ............................ 250/226, 231.19, 250/227.18, 227.21, 227.23; 359/124

[56] References Cited

U.S. PATENT DOCUMENTS

| | | | |
|---|---|---|---|
| 4,367,040 | 1/1983 | Goto | 356/44 |
| 4,833,317 | 5/1989 | Huggins . | |
| 4,931,636 | 6/1990 | Huggins . | |
| 4,964,727 | 10/1990 | Huggins . | |
| 5,010,346 | 4/1991 | Hamilton et al. | 341/137 |
| 5,020,379 | 6/1991 | Berthold et al. . | |
| 5,068,528 | 11/1991 | Miller et al. . | |
| 5,196,694 | 3/1993 | Berthold et al. . | |
| 5,227,624 | 7/1993 | Henning et al. | 250/227.23 |
| 5,281,811 | 1/1994 | Lewis | 250/226 |
| 5,401,958 | 3/1995 | Berkcan | 250/227.23 |

OTHER PUBLICATIONS

Jack L. Jewell, J. P. Harbison, A. Scherer, Y. H. Lee, and L. T. Florez, *Vertical–Cavity Surface–Emitting Lasers: Design, Growth, Fabrication, Characterization*, IEEE Journal of Quantum Electronics, vol. 27, No. 6 Jun. 1991.
Jack Jewell, *Surface–emitting lasers reach R&D threshold*, Laser Focus World May 1990.
L. A. Coldren, R. S. Geels, S. W. Corzine, J. W. Scott, *An Invited Paper Efficient vertical–cavity lasers*, Optical and Quantum Electronics 24(1992) S105–S119.

Connie J. Chang–Hasnain, J. P. Harbison, Chung–En Zah, M. W. Maeda, L. T. Florez, N. G. Stoffel, and Tien–Pei Lee, *Multiple Wavelength Tunable Surface–Emitting Laser Arrays*, IEEE Journal of Quantum Electronics, vol. 27, No. 6, Jun. 1991.
*Surface Emitting Laser Arrays with Uniformly Separated Wavelengths*, Reprinted from Electronics Letters 21st Jun. 1990 vol. 26, No. 13 pp. 940–941.
B. Tell, K. F. Brown–Goebeler, R. E. Leibenguth, F. M. Baez, and Y. H. Lee, *Temperature dependence of GaAs–AlGaAs vertical cavity surface emitting lasers*, Appl. Phys. Lett 60, 10 Feb. 1992.
Jack L. Jewell and Greg R Olbright, *Surface–emitting lasers emerge from the laboratory*, Laser Focus World May 1992 (p217).
Optic Letters, vol. 16, No. 12, Jun. 15, 1991.
Jack L. Jewell, James P. Harbison and Axel Scherer, *Microlasers*, Scientific American Nov. 1991.
Connie J. Chang–Hasnain, J. P. Harbison, Chung–En Zah, M. W. Maeda, L. T. Florex, N. G. Stoffel, Tien–Pei Lee, *Multiple Wavelength Tunable Surface–Emitting Laser Arrays*, 0018–9197/91/0600–1368501.00© 1991 IEEE.

(List continued on next page.)

Primary Examiner—Edward P. Westin
Assistant Examiner—Stephen Calogero
Attorney, Agent, or Firm—Mary Y. Redman

[57] ABSTRACT

An optical sensor system uses a light source which outputs light at a plurality of wavelengths which vary with time in a manner such that only one wavelength is output at any one point in time; and a transducer which modulates light at each wavelength in a manner indicative of the parameter (for example, position or temperature) begin sensed. The transducer's output is, therefore, an optical signal in which the modulated intensity varies with time since only one wavelength is output at any one point in time. Because only a single wavelength is output at any one time, there is no need for an optical demultiplexer and detector array. Only a single detector is needed.

7 Claims, 3 Drawing Sheets

OTHER PUBLICATIONS

K. Tai, K. F. Huang, C. C. Wu and J. D. Wynn, *Continuous Wave Visible InGaAlP Quantum Well Surface Emitting Laser Diodes*, Electronics Letters 22 Jul. 1993 vol. 29, No. 15.

B. Moller, E. Zeeb, U. Fiedler, T. Hackbarth, and K. J. Ebeling, *Linewidth Enhancement Factor of Vertical–Cavity Surface–Emitting Laser Diodes*, 1041–1135/94$04.00© 1994 IEEE.

M. G. Peters, D. B. Young, F. H. Peters, J. W. Scott, B. J. Thibeault and L. A. Coldren, *17.3% Peak Wall Plug Efficiency Vertical–Cavity Surface–Emitting Lasers Using Lower Barrier Mirrors*, 1041–1135/94$04.00© 1994 IEEE.

R. A. Morgan, G. D. Guth, C. Zimmer, R. E. Leibenguth, M. W. Focht, J. M. Freund, K. G. Glogovsky, T. Mullally, F. F. Judd, M. T. Asom, *Two Dimensional Matrix Addressed Vertical Cavity Top–Surface Emitting Laser Array Display*, 1041–1135/93$04.00© 1994IEEE.

Yoshitaka Kohama, Yoshitaka Ohiso, Seiji Fukushima, Takashi Kurokawa, *8×8 Independently Addressable Vertical–Cavity Surface–Emitting Laser Diode Arrays Grown by MOCVD*, 1041 1135/94$04.00© 1994 IEEE.

G. Shtengel, H. Temkin, P. Brusenbach, T. Uchida, M. Kim, C. Parsons, W. E. Quinn, S. E. Swirhun, *High–Speed Vertical–Cavity Surface Emitting Laser*, 1041–1135/93$03.00© 1993 IEEE.

M. W. Maeda, C. J. Chang–Hasnain, Chinlon Lin, J. S. Patel, H. A. Johnson, J. A. Walker, *Use of a Multiwave Surface–Emitting Laser Array in a Four–Channel Wavelength–Division–Multiplexed System Experiment*, 1041–1135/91/ 0300–0268$01.00© 1991 IEEE.

K. Rastani, M. Orenstein, E. Kapon, A. C. Von Lehmen, *Integration of planar Fresnel microlenses with vertical–cavity surface–emitting laser arrays*, 0146–9592/91/ 120919–03$5.00/0© 1991 Optical Society of America.

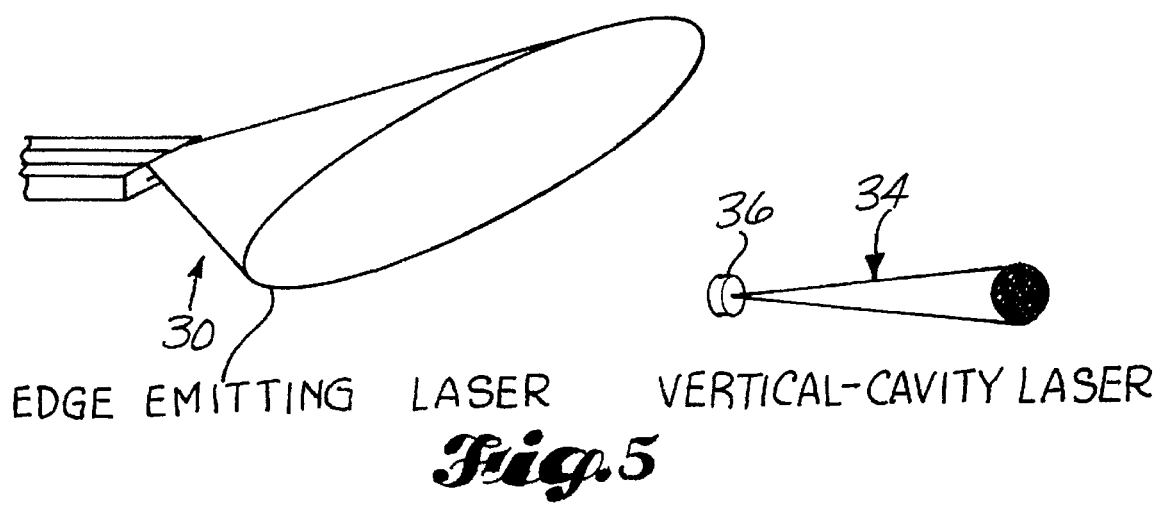
Fig. 5
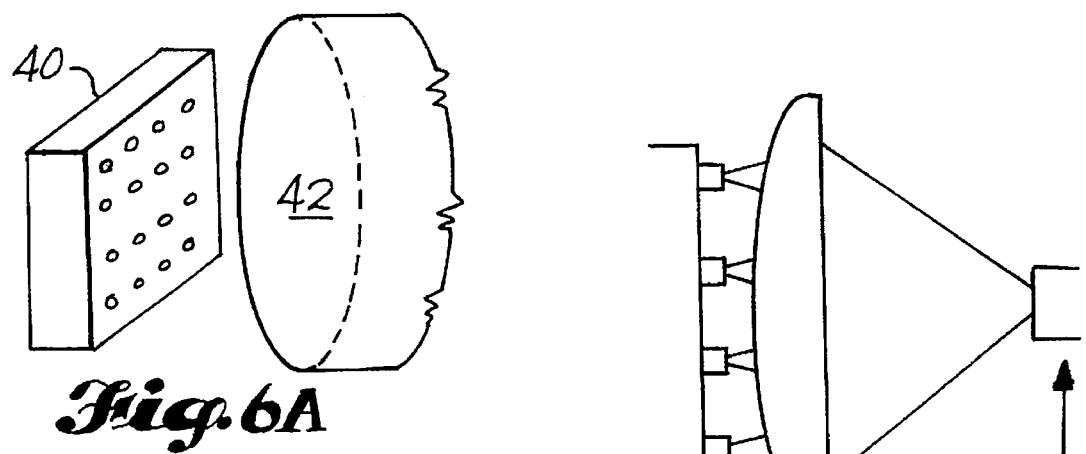
Fig. 6A
Fig. 6B
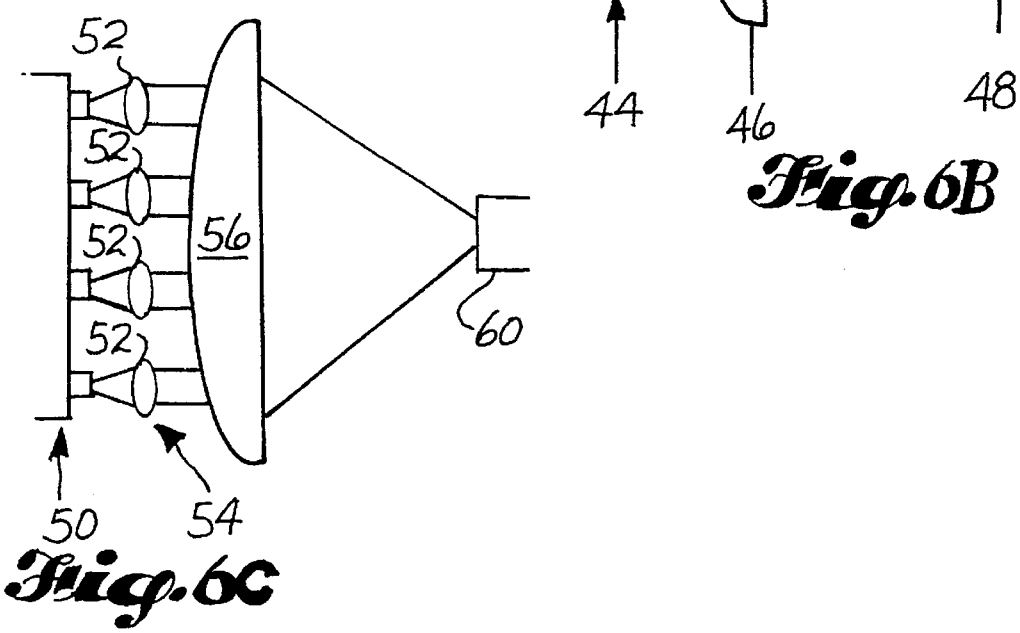
Fig. 6C

OPTICAL SENSOR USING SWEPT WAVELENGTH LIGHT SOURCE

BACKGROUND OF THE INVENTION

This invention is in the field of optical sensors. Optical sensors for sensing position and other physical properties are of great interest in the aerospace industry. They can be used in fly-by-light systems on aircraft to sense position of actuators that control flaps, rudders, and the like. In this environment, optical sensors are particularly attractive because the sensors and the optical fibers that transmit signals to and from them, are lightweight, compact and immune to EMI effects. Examples of optical sensors are found in U.S. Pat. Nos. 4,740,688, 4,833,317, 4,931,636, 4,964,727, and 5,068,528, all of which are incorporated herein by reference.

Wavelength division multiplexing (WDM) techniques come into play in many proposed optical sensors. U.S. Pat. Nos. 4,740,688, 4,931,636, 4,964,727, and 5,068,528, referenced above, show examples of such systems. FIG. 1 shows schematically a typical WDM sensor system. A typical WDM system includes a broadband light source 10, a WDM transducer 12, and a demultiplexing receiver 14. Typical broadband sources for this application include multiple LED's with their outputs combined by a coupler, multiple LED's fabricated on the same die, and incandescent light bulbs. FIG. 2a shows the typical relationship between intensity and wavelength for such broadband sources. The transducer 12 selectively modulates different wavelength bands in a manner which corresponds to the property being sensed. One example of a WDM transducer is an encoder plate which either rotates or moves linearly in response to movement of the element whose position is being sensed. In a transducer with a multitrack digital code plate, the light in selected wavebands is modulated digitally (on or off). An example of such a transducer is shown in U. S. Pat. No. 4,740,688. FIG. 2b shows an example of a possible output from such a transducer in which the light intensity in different wavelength ranges varies with the position of the encoder plate. Alternatively, the light intensity can be analog modulated by a code plate whose density varies with position, or by microbend induced losses in a fiber. In an intensity modulated transducer, it is necessary to provide an intensity reference, typically, light at a second wavelength which passes through the transducer unmodulated. An example of such a system using a code plate is shown in U.S. Pat. No. 4,931,636. A system using micobend induced losses is shown in U.S. Pat. No. 5,020,379, which is incorporated herein by reference.

The demultiplexing receiver 14 includes a dispersion element 16 which separates light into the different wavelength bands, and an array of photodetectors 17 where each pixel measures the light intensity in a particular wavelength band. The, outputs of the detectors are then sequentially read as a serial bit stream, or as a parallel data word.

In a two wavelength intensity referencing system the demultiplexing receiver can be a simple WDM splitter and two PIN diode detectors. However, systems where up to twenty wavelength bands are modulated may have important performance advantages for multiplexing transducers. But the demultiplexing receiver for such a multi-wavelength system requires a dispersion device such as a diffraction grating, an array detector such as a PIN diode or CCD array, and associated optical components such as lenses. The complexity of such a demultiplexing receiver makes it difficult to fabricate, hard to maintain performance over temperature, and therefore expensive. Such a receiver also suffers from being optically inefficient, with overall efficiencies of less than 10% being typical.

What is needed then, is an optical sensor system that is relatively simple, easy to fabricate, optically efficient, and reliable in its operating environment.

SUMMARY OF THE INVENTION

The invention provides an optical sensor system that fills this need in a novel manner by using a light source which outputs light at a plurality of wavelengths which vary with time in a manner such that only one wavelength is output at any one point in time; and a transducer which modulates light at each wavelength in a manner indicative of the parameter (for example, position, pressure, or temperature) being sensed. The transducer's output is, therefore, an optical signal in which the modulated intensity varies with time and only one wavelength is output at any one point in time. Because only a single wavelength is output at any one time, there is no need for a demultiplexing receiver (an optical demultiplexer and a detector array). Only a single detector is needed. This greatly simplifies the operation and fabrication of the sensor system, lowers costs, and leads to high reliability and greatly increased optical efficiencies.

These advantages over the prior art are made possible and practical by the use of Vertical-Cavity Surface Emitting Lasers (VCSELs) as a swept wavelength source. VCSELs are solid state lasers having optical cavities orthogonal to those of conventional edge-emitting diode lasers. They have properties that make them highly suitable for use as light sources for optical fiber sensors. These include output beams characterized by a low divergence angle, cylindrical symmetry and small diameter. Because of these properties, a large fraction of the emitted power can be coupled into an optical fiber without the astigmatic focusing which is required for edge emitting laser diodes. Also, because an array of VCSELs on a single die can be fabricated with a very small pitch between adjacent VCSELs (20 µm may be possible), multiple individually addressable VCSEL sources can be coupled into a single fiber. This results in a simple system with fewer optical components and greater optical efficiency.

Operation of such a swept wavelength source utilizing a VCSEL array is highly reliable. The emitted wavelengths of the individual VCSELs in an array can be varied in a controlled manner by means well known to those skilled in the art. Also, the effect of temperature on the performance of VCSELs is closer to that of an LED than that of an edge emitting laser diode, making the VCSEL attractive for its operation in harsh environments.

Use of VCSELs is further advantageous in that fabrication of a VCSEL is simpler than for edge emitting laser diodes, which results in lower cost for any sensor system utilizing a VCSEL-based swept wavelength optical source. And, because of the narrow waist diameter of the radiation pattern of the output beam of a VCSEL, an electro-optic interface using such a swept wavelength source can be made very compact. This is especially important in aircraft applications, where space is limited.

BRIEF DESCRIPTION OF THE DRAWINGS

FIG. 5 illustrates properties of the beam emitted from a VCSEL.

FIGS. 6a, 6b, 6c, 6d, and 6e show several alternatives for coupling the output of a VCSEL array to an optical fiber.

DETAILED DESCRIPTION OF THE DRAWINGS

Figure 1:
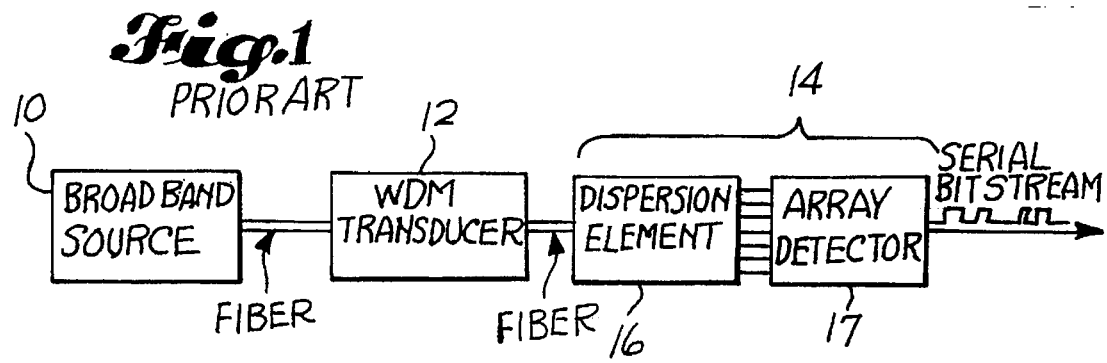
FIG. 1 is a schematic diagram of a typical WDM optical sensor system.
Figure 2A:
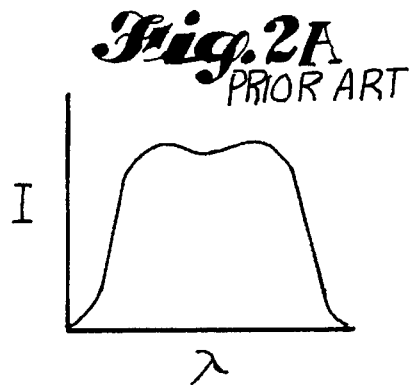
FIG. 2a shows an example of the intensity versus wavelength relationship for the output of a typical broadband source.
Figure 2B:
FIG. 2b shows an example of the intensity versus wavelength relationship for the output of a WDM transducer in a prior art sensor system.
Figure 3:
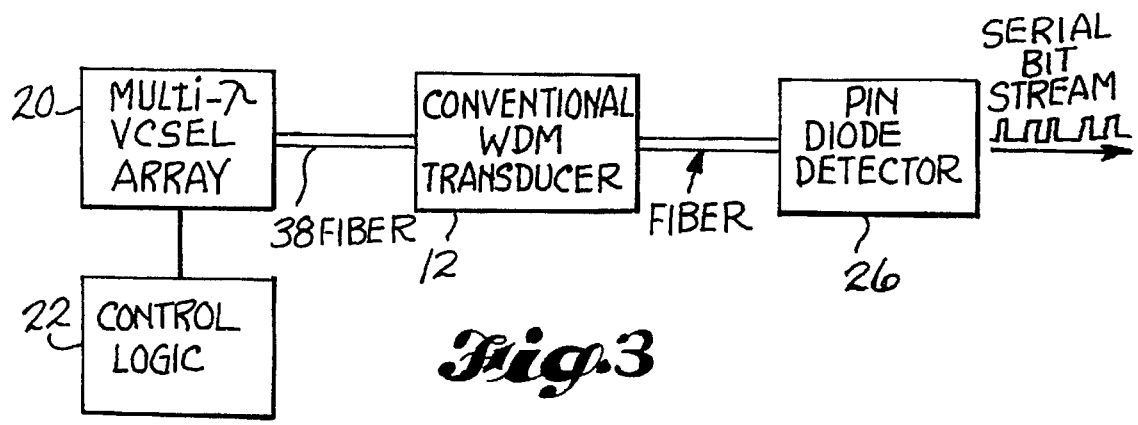
FIG. 3 is a schematic diagram of an optical sensor system according to a preferred embodiment of the invention.
Figure 4A:
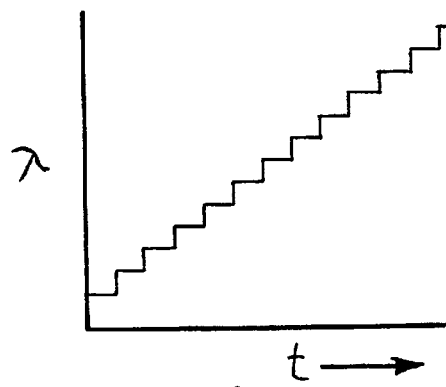
FIG. 4a shows an example of the wavelength versus time relationship for the output of a VCSEL swept wavelength source.
Figure 4B:
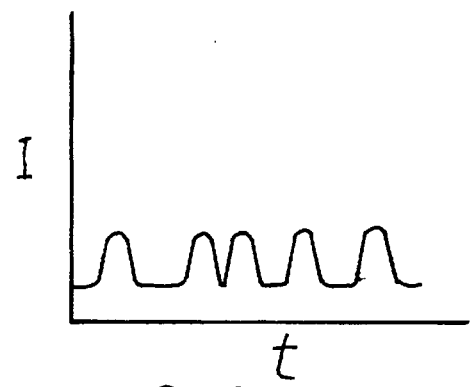
FIG. 4b shows an example of the intensity versus time relationship for the output of a transducer in a preferred embodiment of the invention.

FIG. 3 shows a WDM sensor system according to a preferred embodiment of the invention. In this system, a swept wavelength optical source 18 which includes a multi-wavelength VCSEL array 20 with associated control logic circuit 22 is used instead of a conventional broadband source. As shown in FIG. 4a, this means that in the input signal wavelength is a function of time, and typically, a substantially steadily increasing, roughly step-wise function of time. Any conventional WDM transducer 12 may be used, and intensities at given wavelengths are modulated to correspond to the property being measured as in a conventional sensor system. However, since the input wavelength is a function of time, the output signal is now one in which the intensity varies with time. An example of the intensity versus time relationship one would see in the output from the transducer is shown in FIG. 4b. Thus, since only a single wavelength is output at any one time, a single detector 26 can be used, rather than an optical demultiplexer and a detector array.

The swept wavelength optical source can be provided by use of a one or two dimensional array of Vertical Cavity Surface Emitting Lasers (VCSELs). A VCSEL is a solid state laser which has a fundamental advantage over edge-emitting lasers in that a VCSEL emits a beam whose profile is cylindrically symmetrical with relatively little divergence. FIG. 5, although not drawn to scale, illustrates the concept of this difference between the outputs of edge-emitting lasers and VCSELs. A typical beam 30 from an edge emitting laser 32 may diverge from a 1×3 µm origin to a 60°×19° elliptical far-field pattern, for example. A typical beam 34 from a VCSEL 36, on the other hand, will to a large degree maintain circular symmetry with little divergence. A VCSEL output beam having a 7.5 µm diameter origin may have a 7.6° far-field pattern, for example. VCSELs are discussed in "Surface-emitting Lasers Emerge from the Laboratory," by Jack L. Jewell and Greg R. Olbright, *Laser Focus World*, May 1992, pages 217–223; "Vertical-Cavity Surface-Emitting Lasers: Design, Growth, Fabrication, Characterization," by Jack L. Jewell et al., *IEEE Journal of Quantum Electronics*, Vol. 27, No. 6, June 1991, pages 1332–1346, and elsewhere in the published literature.

VCSELs are usually fabricated as one or two dimensional arrays of multiple VCSELs on a single die. Typical dimensions for a two dimensional array are on the order of 250 µm to 1 mm. For use in a swept wavelength source, a multiple wavelength VCSEL array in which each VCSELs outputs light at a different characteristic wavelength is controlled by a control circuit which pulses each individual VCSEL sequentially so that only one VCSEL in the array is outputting light at any one time.

Figure 6D:
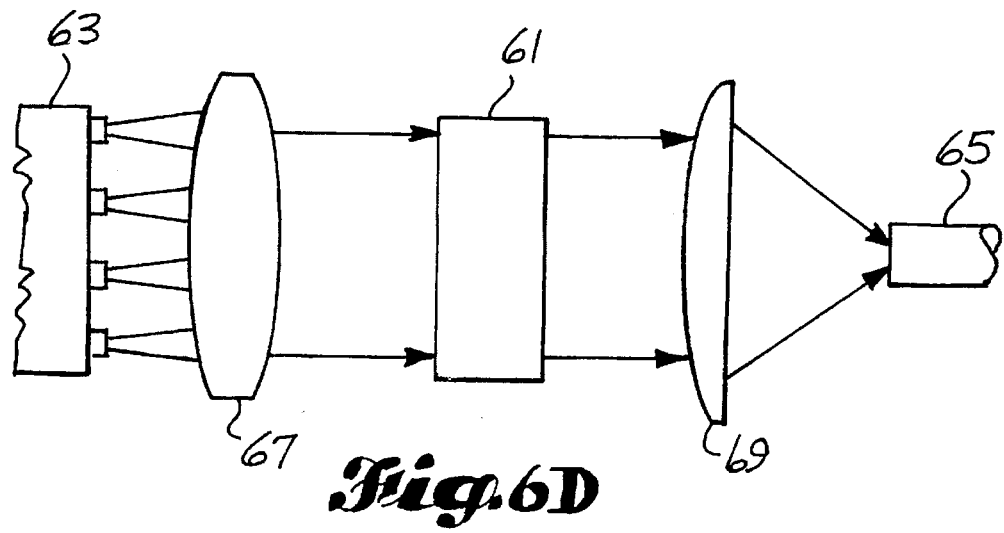

A two-dimensional array or a linear array may be used in the embodiment of FIG. 3, where it can be coupled to the fiber 38 which transmits its outputs to the transducer 24 by mechanisms such as those shown in FIGS. 6a, 6b, 6c, 6d, and 6e. FIG. 6a shows a VCSEL array 40 butt coupled to a fiber 42 chosen so as to be of sufficient diameter to accept light from the desired area of the array. FIG. 6b shows a VCSEL array 44 whose outputs pass through a lens 46 which focuses the output beams on the end of a fiber 48. FIG. 6c shows a VCSEL array 50 whose output beams individually pass through microlenses 52 in a microlens array 54, and then into a focusing lens 56 which focuses the beams into the end of a fiber 60. FIG. 6d shows a coupling alternative which uses a volume hologram 61 to focus the output of a VCSEL array 63 onto the end of a fiber 65. Collimating and focusing lenses 67, 69 may be positioned on both sides of the volume hologram 61.

Figure 6E:
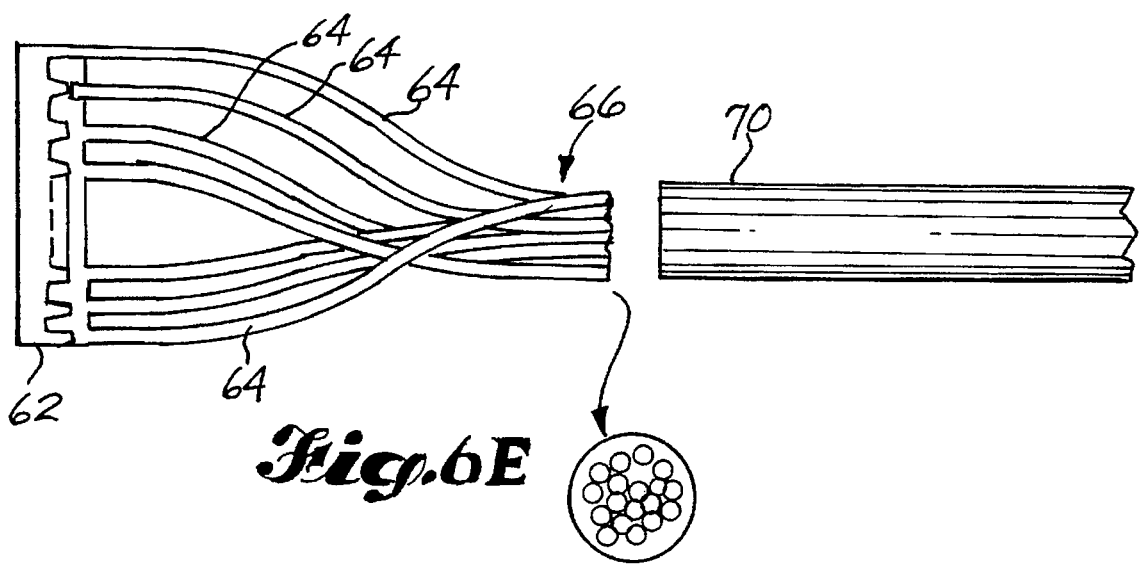

FIG. 6e shows a coupling alternative suited for a linear array. A linear array is particularly advantageous for ease of packaging. The linear VCSEL array is especially easy to interface electrically with control logic lines, since the geometry has more available space for each such line. As shown in FIG. 6e, each VCSEL in a linear array 62 can be coupled to a narrow diameter fiber 64 in a bundle of fibers 66 held in alignment by a v-groove element 68 and then gathered together for butt-coupling into a larger diameter fiber 70. The narrow diameter fibers would preferably be on the order of 25 µ in diameter, while the large diameter fiber would preferably be on the order of 100 to 200 µm in diameter.

It will be understood that the embodiments described above are merely illustrative and that persons skilled in the art may make many variations and modifications, including combinations of various features of the illustrated embodiments, without departing from the spirit and scope of the invention. All such modifications and variations are intended to be within the scope of the invention as defined in the appended claims.

What is claimed is:

1. An optical sensor which senses a physical property and outputs a signal indicative of that property comprising:

a Vertical Cavity Surface Emitting Laser (VCSEL) array which outputs light at a plurality of wavelengths which vary with time in a manner such that only one wavelength is output at any one point in time;

a transducer which receives said light output by said VCSEL array and responds to said physical property so as to selectively modulate the intensity of said light at successive wavelengths within said plurality of wavelengths in a manner indicative of said physical property, whereby said transducer outputs an optical signal in which said modulated intensity varies with time and only one wavelength is output at any one point in time;

a single detector which receives the optical output signal from the transducer and outputs a signal indicative of the property being sensed; and a first optical path means for directing light from said VCSEL array to said transducer; and a second optical path means for directing light output from said transducer to said detector.

2. An optical sensor according to claim 1 wherein said VCSEL array is a linear array.

3. An optical sensor according to claim 2 wherein said first optical path means comprises a single optical fiber and wherein individual VCSEL elements in said array are each butt-coupled to separate optical fibers in an optical fiber bundle which is coupled to said single optical fiber which transmits the outputs of the VCSEL elements to said transducer.

4. An optical sensor according to claim 2 wherein said first optical path means comprises a single optical fiber and wherein said VCSEL array is butt-coupled to said single optical fiber which transmits the outputs of the VCSEL elements to said transducer.

5. An optical sensor according to claim 2 wherein said first optical path means comprises a single optical fiber and father comprising a lens positioned so as to focus the outputs from said VCSEL array into said single optical fiber which transmits the outputs of the VCSEL elements to said transducer.

6. An optical sensor according to claim 5 further comprising a plurality of lenses each of which is positioned adjacent a VCSEL element so as to direct the output from said element into said lens which focuses the outputs from said VCSEL array into said optical fiber.

7. An optical sensor according to claim 2 wherein said first optical path means comprises a single optical fiber and further comprising a holographic element positioned so as to direct the output from said VCSEL array into said single optical fiber.

* * * * *